Jan. 31, 1950     H. G. MILLER ET AL     2,495,816
VENTILATING SYSTEM FOR DIESEL HOUSES
Filed July 29, 1948     3 Sheets-Sheet 3
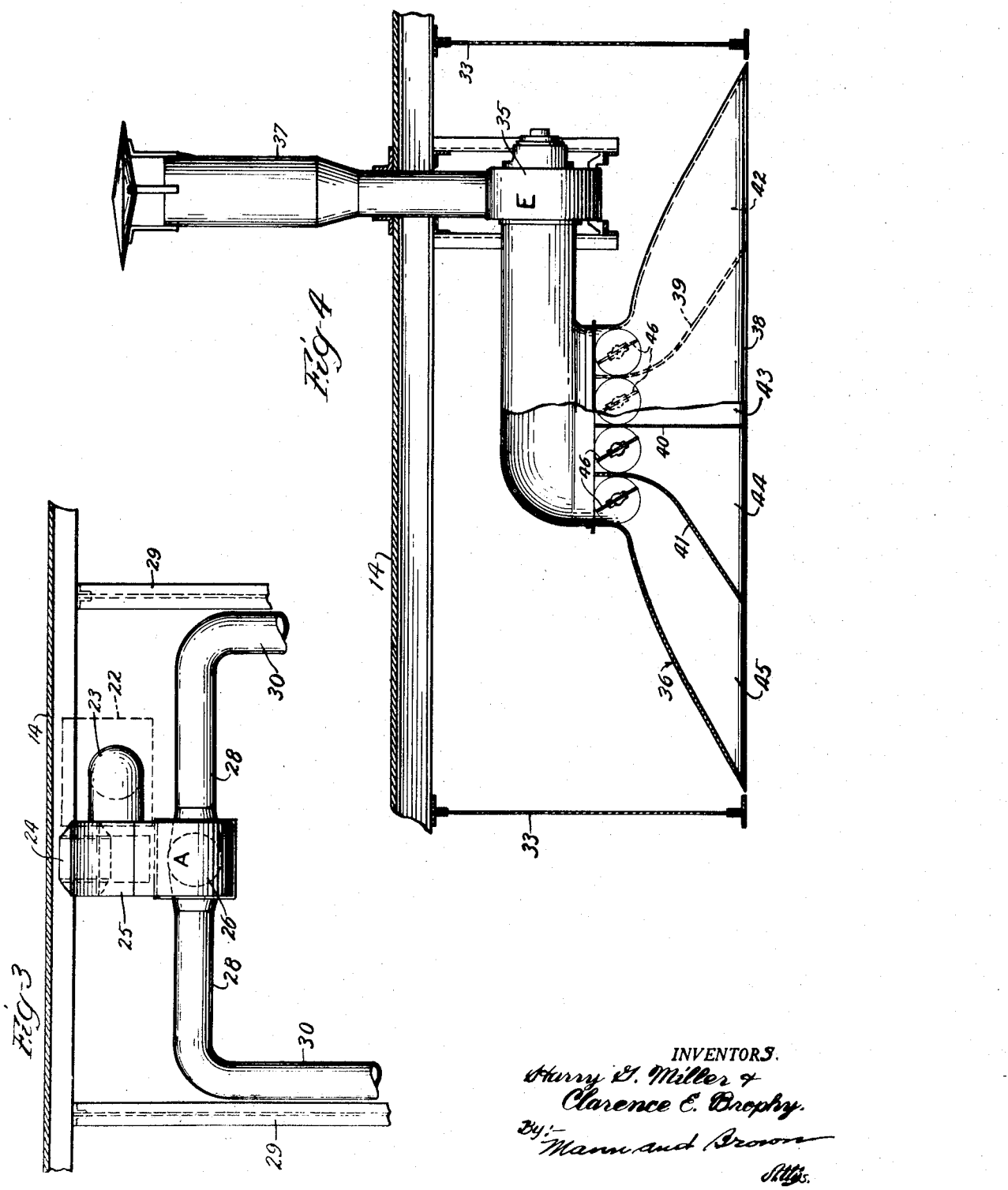
INVENTORS.
Harry G. Miller &
Clarence E. Brophy.
By: Mann and Brown
Attys.

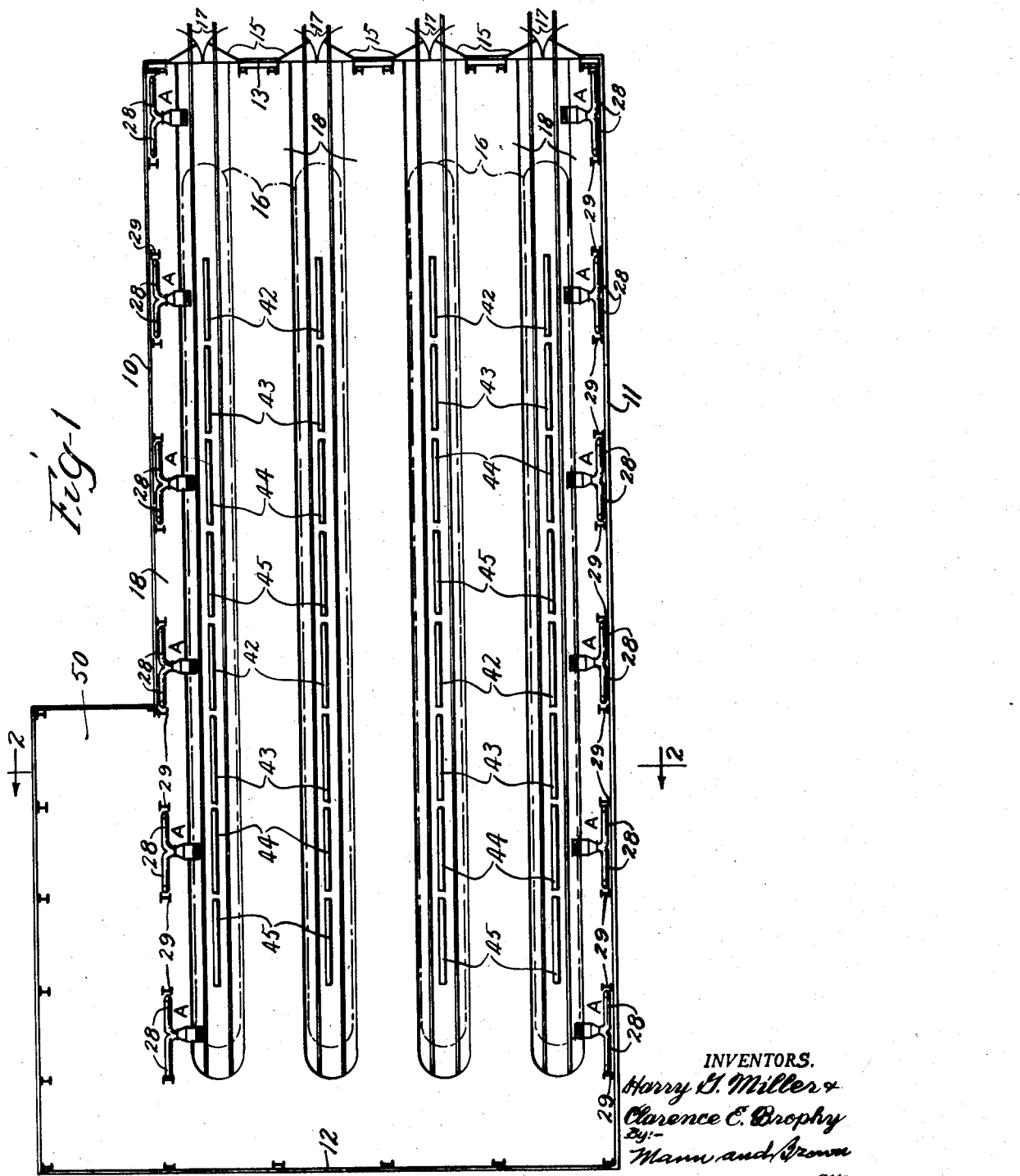

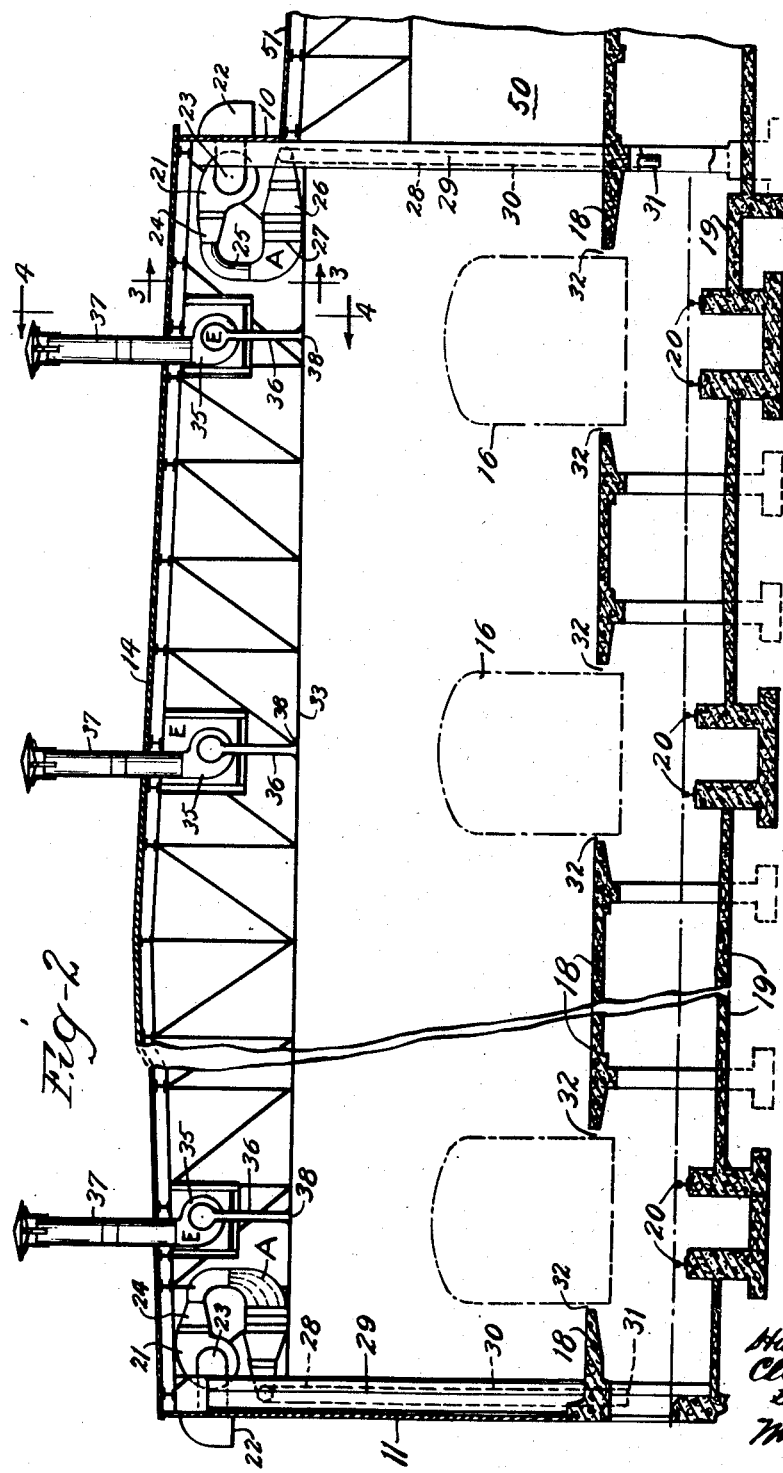

Patented Jan. 31, 1950

2,495,816

UNITED STATES PATENT OFFICE 2,495,816

VENTILATING SYSTEM FOR DIESEL HOUSES

Harry G. Miller, West Allis, and Clarence E. Brophy, Wauwatosa, Wis.

Application July 29, 1948, Serial No. 41,352

2 Claims. (Cl. 98—33)

This invention relates to ventilation of engine houses for Diesel locomotives, and has for its principal object to supply ample fresh air for health and comfort of the workmen and for combustion, and to remove the exhaust gases so quickly that they cannot contaminate the air supply.

There is no standard location for exhaust pipes of Diesel engines. Hence, the exhaust means must be operative all along the trackage to take out the exhaust gases before they can contaminate the air content of the house.

Fresh air for combustion must equal the engine requirements or faulty combustion will interfere with engine performance and produce gases more dangerous than normal exhaust.

Hence, the invention contemplates a copious supply of tempered air for health and comfort of workmen and for engine supply and selective exhaust means to take out the products of combustion directly from the engine exhaust pipes regardless of location.

The accompanying drawings are diagrams of an engine house on the order of 260 feet long by 100 feet wide equipped with trackage for four 4-unit 5400 horsepower locomotives together with an auxiliary machine annex at one side, which is optional.

Fig. 1 is a plan view;

Fig. 2 is a cross-section on the line 2—2 of Fig. 1 with certain parts broken away; and Figs. 3 and 4 are cross-sections taken on the lines 3—3 and 4—4 of Fig. 2.

The engine house includes side walls 10 and 11, end walls 12 and 13, and a roof 14. The end wall 13 is provided with door openings 15 permitting locomotives 16 to enter and depart along tracks 17, which are flanked by platforms 18 at the engine deck level and spaced from the floors 19 and the elevated rails 20.

The tracks are spaced about 25 feet on centers, and the tracks at each side are about 12½ feet from the walls.

The fresh air supply is taken from some convenient locations selected according to conditions to avoid contamination. It is appropriately filtered, heated or cooled, and distributed to the interior of the building in accordance with the accepted principles of air conditioning. In these diagrammatic illustrations, that fresh air is supplied by units generally indicated by A, one for each alternate 20-foot bay beginning with the front adjacent to the entrance end wall 13.

Each unit (Figs. 2 and 3) includes a centrifugal blower 21, a screened inlet 22, an intake pipe 23, a discharge pipe 24, connections 25 leading to a conditioning chamber 26, fitted with tempering means 27, such as steam pipes, refrigeration coils, sprays, etc., as is customary for such apparatus. From the conditioning chamber the conditioned air is delivered under pressure to branch pipes 28 extending to the adjacent column 29 and then turning downwardly along the column, as indicated at 30, and delivering to the interior of the house adjacent to the floor, or at some suitable lower level, here indicated at 31, below the side platforms 18. With such delivery, the floors 19, platforms 18, and locomotives 16 form distributing channels having elongated outlets 32 between the locomotives and the platforms for air into the main space of the building.

In this installation at the Milwaukee shops of the Chicago, Milwaukee, St. Paul and Pacific Railroad Company in Milwaukee, Wisconsin, there are 14 blowers each delivering 6100 cubic feet per minute and wired for selective control and operation, all simultaneously, groups simultaneously and individual blowers separately, thus making the supply flexible and selectively adaptable to individual conditions at different times.

The screened intakes are shown opening downwardly along the sides 10 and 11 below the roof line but may be elsewhere according to conditions. The blowers and conditioning chambers are conveniently arranged within the area of the roof trusses 33 and are supported thereon. The pipes 28 are within the wall area, and thus do not encroach upon the useful space.

The exhaust gases are removed by units generally indicated by E distributed in a series along the roof area directly above the tracks and centered with them.

Each exhaust unit E includes a centrifugal blower 35, a manifold 36, and a stack 37, the latter extending above the roof, and to such place as may be expedient under the conditions to avoid contamination of the fresh air supply.

Each manifold 36 is long and narrow, approximately 19 feet long and 4 inches wide, with the lower edges curved as indicated at 38 (Fig. 2). Each manifold 36 is divided by partitions 39, 40, and 41 into four separate passages 42, 43, 44, and 45 in series along over the track and each equipped with a damper 46 on the order of 4" x 15", selectively controlled to permit all or any number to be opened or closed as may be expedient to concentrate the effect of the blower or blowers 35 in an area immediately adjacent to the end of the engine exhaust pipe to the end that the exhaust gases may be directly and quickly whisked away from the interior of the building to prevent contamination of the air supply.

The blowers 35 are wired for individual and collective operation in whole or in any suitable groups so as to make the exhaust flexible and adapted to the needs of any particular number of locomotives in any particular arrangement that may be found expedient in the use of the apparatus.

In the installation mentioned, there are 36 exhaust units in 4 rows corresponding to the 4 tracks, and each blower 35 has capacity of 3100 cubic feet per minute.

The machine bay 50, shown, which is optional, projects from the side wall 10 adjacent to the end wall 12 and is shown with a somewhat lower roof 51. If a bay, which may be a machine bay or an annex for any purpose, is added, it may be supplied with air from adjacent supply units and, of course, will be affected by the general supply as well as the general exhaust.

The tempering means 27 consists of separate heat exchangers or air heating radiators arranged in multiple to heat incoming air to comfortable working temperature. Steam to each of these units is controlled by automatic valves, each of which operates within a definite range of outside temperature, resulting in a fairly uniform outlet air temperature regardless of the outside temperature.

We claim:

1. In an engine house for Diesel locomotives, an enclosure having side walls, trackage on the floor of said enclosure, means for forcing fresh exterior air into said enclosure adjacent the bottoms of said side walls in sufficient quantity to ventilate said enclosure and support combustion in locomotives on said trackage, a series of exhaust means arranged closely adjacent each other to define an elongated row of exhaust openings over said trackage, each said exhaust means comprising an elongated hood extending in the direction of said row, transverse partitions in said hood defining a plurality of passageways therein, selectively operable damper means in each of said passageways, and a blower for each of said exhaust means arranged to move products of combustion therethrough and to the exterior of said enclosure.

2. In an engine house for Diesel locomotives, an enclosure having side walls, trackage on the floor of said enclosure, means for forcing fresh exterior air into said enclosure adjacent the bottoms of said side walls in sufficient quantity to ventilate said enclosure and support combustion in locomotives on said trackage, exhaust means arranged over said trackage, a blower for said exhaust means arranged to move products of combustion therethrough and to the exterior of said enclosure, a horizontal partition in said enclosure above the floor thereof, and elongated openings through said partition over said trackage, said openings being of a width to accommodate locomotives on said trackage with substantial clearance at the sides thereof, said partition being effective to direct fresh air delivered thereunder to said elongated openings for upward movement adjacent said locomotives and toward said exhaust means.

HARRY G. MILLER.
CLARENCE E. BROPHY.

REFERENCES CITED

The following references are of record in the file of this patent:

UNITED STATES PATENTS

| Number | Name | Date |
|---|---|---|
| 852,794 | Larivee | May 7, 1907 |
| 928,158 | Smethurst | July 13, 1909 |
| 929,115 | Schlacks | July 27, 1909 |
| 1,114,001 | Ilg | Oct. 20, 1914 |
| 1,131,192 | White | Mar. 9, 1915 |
| 1,160,305 | MacLauchlan | Nov. 16, 1915 |
| 1,676,969 | Sutton et al. | July 10, 1928 |
| 2,014,962 | Bramsen | Sept. 17, 1935 |
| 2,141,403 | Offen | Dec. 27, 1938 |